US007890592B2

(12) United States Patent  (10) Patent No.: US 7,890,592 B2
Setiawan et al.  (45) Date of Patent: Feb. 15, 2011

(54) PROCESSING DATA OBTAINED FROM A PRESENCE-BASED SYSTEM

(75) Inventors: Henry W. Setiawan, Bothell, WA (US); George Joy, Kirkland, WA (US); Alexandra K. Heron, Kirkland, WA (US); Ramesh K. Vyaghrapuri, Kenmore, WA (US); Diego E. Rejtman, Redmond, WA (US); Muneer Mirza, Seattle, WA (US); Kitty L. Leung, Redmond, WA (US); Keiji Kanazawa, Seattle, WA (US); Nicolas Duchastel de Montrouge, Woodinville, WA (US); Vlad Cretu, Seattle, WA (US); Darren Louie, Toronto (CA)

(73) Assignee: Microsoft Corporation, Redmond, WA (US)

( * ) Notice: Subject to any disclaimer, the term of this patent is extended or adjusted under 35 U.S.C. 154(b) by 216 days.

(21) Appl. No.: 12/040,766

(22) Filed: Feb. 29, 2008

(65) Prior Publication Data
US 2009/0063643 A1  Mar. 5, 2009

Related U.S. Application Data

(63) Continuation of application No. 11/772,111, filed on Jun. 29, 2007, now abandoned.

(51) Int. Cl.
G06F 15/16 (2006.01)
(52) U.S. Cl. .................................... 709/206
(58) Field of Classification Search .................. 709/206
See application file for complete search history.

(56) References Cited

U.S. PATENT DOCUMENTS 6,731,323 B2  5/2004  Doss et al.
6,757,365 B1  6/2004  Bogard
6,907,447 B1  6/2005  Cooperman et al.
7,545,762 B1 *  6/2009  McConnell et al. ...... 370/310.2

(Continued)

FOREIGN PATENT DOCUMENTS

KR  20000064105  11/2000

(Continued)

OTHER PUBLICATIONS

PCT Search Report for PCT Application No. PCT/US2008/068413, mailed Dec. 12, 2008 (10 pages).

(Continued)

*Primary Examiner*—John Follansbee
*Assistant Examiner*—Imad Hussain
(74) *Attorney, Agent, or Firm*—Lee & Hayes, PLLC

(57) ABSTRACT

Functionality is described for collecting data from a presence-based system, such as an instant messaging system. The functionality can extract information from the collected data based on one or more rules. For instance, the functionality can identify presence data and/or message data that includes predetermined key words. The functionality can formulate result information based on the extracted information for presentation to a recipient. Based on these operations, the collected data supports a data-mining operation, as well as the traditional role of facilitating communication among the participants of the presence-based system. The result information can correspond to a report that presents aggregated findings, optionally organized into one or more demographic categories, or the result information can correspond to an advertisement, etc.

19 Claims, 5 Drawing Sheets

U.S. PATENT DOCUMENTS

| | | | |
|---|---|---|---|
| 2002/0021307 A1* | 2/2002 | Glenn et al. | 345/753 |
| 2003/0225848 A1 | 12/2003 | Heikes et al. | |
| 2005/0004995 A1* | 1/2005 | Stochosky | 709/219 |
| 2005/0071433 A1 | 3/2005 | Shah | |
| 2005/0108329 A1 | 5/2005 | Weaver et al. | |
| 2005/0233776 A1* | 10/2005 | Allen et al. | 455/567 |
| 2005/0262204 A1* | 11/2005 | Szeto et al. | 709/206 |
| 2006/0069727 A1 | 3/2006 | Fuller et al. | |
| 2006/0195532 A1* | 8/2006 | Zlateff et al. | 709/206 |
| 2006/0259473 A1* | 11/2006 | Li et al. | 707/3 |
| 2006/0271425 A1 | 11/2006 | Goodman et al. | |
| 2006/0282328 A1 | 12/2006 | Gerace et al. | |
| 2007/0124469 A1* | 5/2007 | Mohammed et al. | 709/225 |
| 2007/0270163 A1* | 11/2007 | Anupam et al. | 455/456.1 |
| 2008/0071875 A1* | 3/2008 | Koff et al. | 709/206 |
| 2010/0036928 A1* | 2/2010 | Granito et al. | 709/206 |

FOREIGN PATENT DOCUMENTS

| | | |
|---|---|---|
| KR | 20070018385 | 2/2007 |

OTHER PUBLICATIONS

"Contextual Collaboration", retrieved on May 11, 2007, at <<http://searchdomino.techtarget.com/sDefinition/0,,sid4_gci934929,00.html>>, Tech Target, 1999-2007, pp. 3.

"iMessengr", retrieved on May 11, 2007, at <<http://blog.imessengr.com/search/label/Windows%20Live%20Messenger%20Add-ons?updated-max=2007-01-17T09%3A13%3A00%2B02%3A00&max-results=20 >>, pp. 14.

* cited by examiner

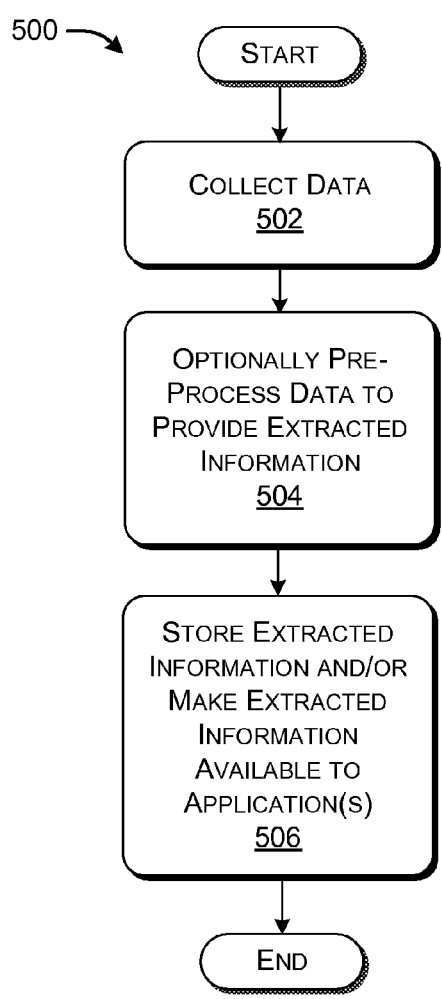
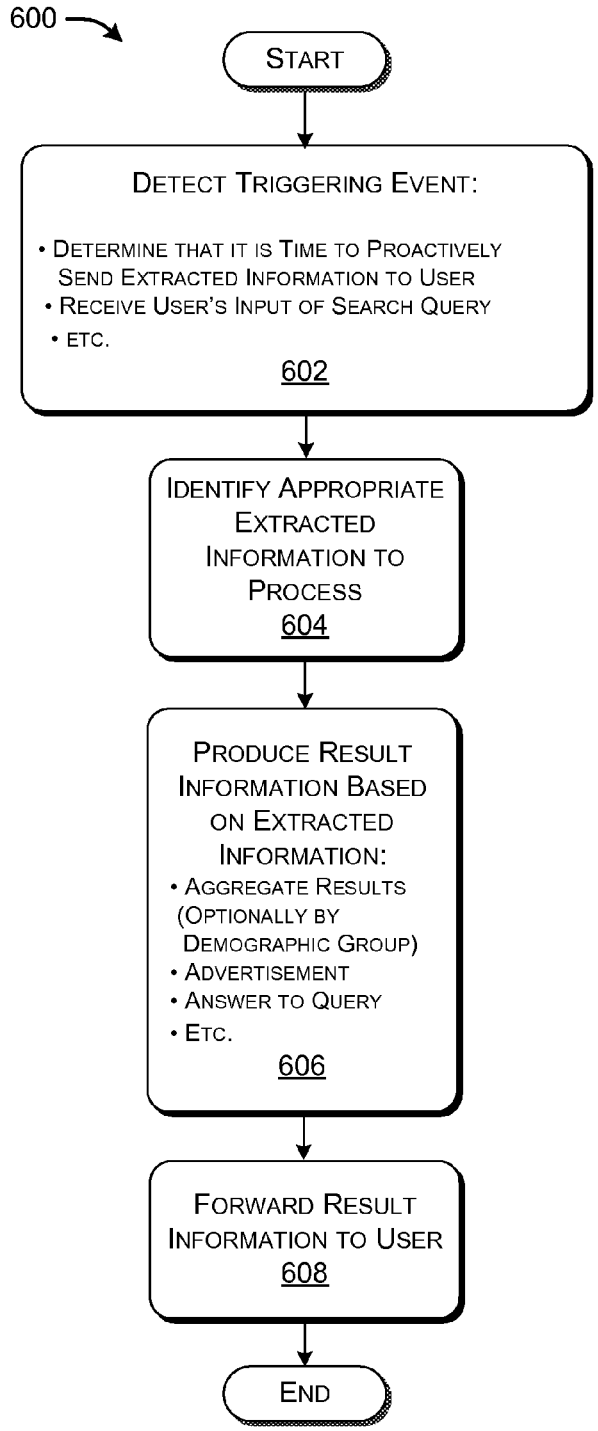
FIG. 5
FIG. 6

PROCESSING DATA OBTAINED FROM A PRESENCE-BASED SYSTEM

RELATED APPLICATIONS

This application is a Continuation of application Ser. No. 11/772,111 filed Jun. 29, 2007, entitled "Processing Data Obtained From a Presence-Based System", and incorporated herein by reference.

BACKGROUND

Presence data describes one or more characteristics regarding a user's current interaction with a presence-based system, such as an instant messaging system. For instance, the presence-based system can communicate status-related presence data to a user's contacts. This type of presence data may inform the contacts that the user is currently online, away, busy, and so forth. The presence-based messaging system can also convey personal data to the user's contacts. The personal data may reveal a personal textual message associated with the user, a display name, and so forth. Instant messaging systems can convey yet other types of presence data. In each case, the presence data generally serves the operational role of facilitating communication among users of the system, e.g., by giving users insight as to what is happening among communication participants.

Message data describes the actual content of messages being exchanged among communication participants. In the case of one type of presence-based system, the message data may include mainly textual content.

SUMMARY

Functionality is described for collecting data from a presence-based system, such as an instant messaging system. The functionality can extract information from the collected data based on one or more rules. For instance, the functionality can identify parts of the collected data that include predetermined key words. The functionality can formulate result information based on the extracted information for presentation to a recipient. By virtue of these operations, the collected data supports a data mining operation, as well as the traditional role of enabling communication among the participants of the presence-based system.

In one illustrative case, the collected data can correspond to presence data used by the presence-based system. In another case, the collected data can correspond to message data that is exchanged among participants of the presence-based system.

In one illustrative case, the result information corresponds to a report. The report conveys aggregated findings that are based on the extracted information. The report can optionally convey the aggregated findings in the context of at least one demographic category. The demographic category can correspond to age, gender, geographical location, and so forth.

In another illustrative case, the result information is expressed in the form of an advertisement. The advertisement has a topic that is based on the extracted information. The approach involves sending the advertisement to users of the presence-based system and/to other users. In one illustrative case, the approach can customize the advertisement sent to a particular user based on data collected from this user.

In another illustrative case, the approach allows users to make targeted on-demand queries. The approach formulates answers to the queries based, at least in part, on the data that was collected from the users.

BRIEF DESCRIPTION OF THE DRAWINGS

FIG. 5 is a flowchart that shows an illustrative procedure for collecting data.

FIG. 6 is a flowchart that shows an illustrative procedure for generating report information based on the collected data.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for forming report information based on data collected from a presence-based system, such as an instant messaging system. In this approach, the collected data supports a data-mining operation, as well as the traditional role of enabling communication among the participants of the presence-based system.

This disclosure includes the following sections. Section A describes an illustrative system for collecting and processing data from a presence-based system. Section B describes illustrative procedures that explain the operation of the system of Section A.

A. Illustrative System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A. 1. Overview of System

Figure 1:
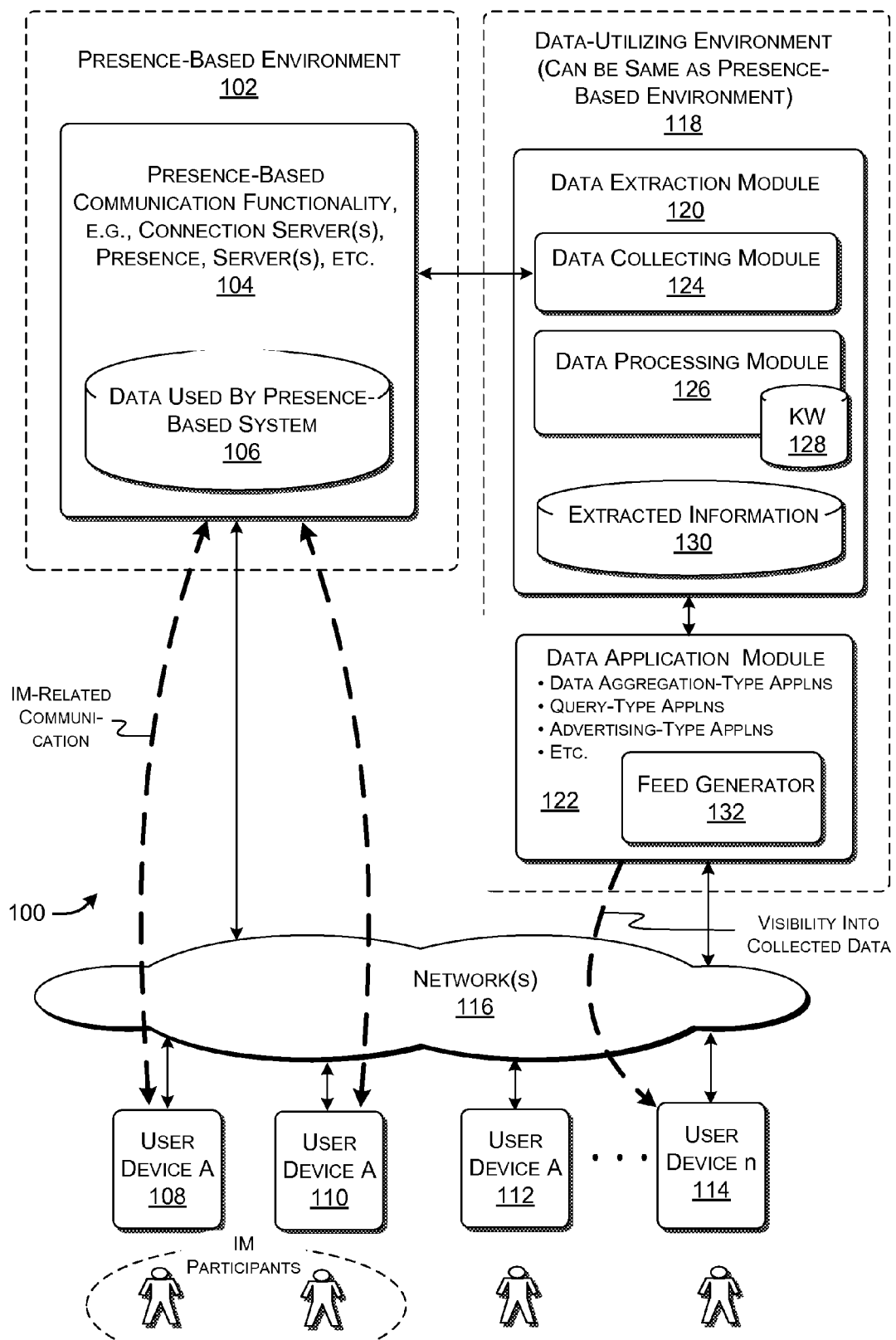
FIG. 1 shows an overview of an illustrative system for mining data from a presence-based system.

FIG. 1 shows an overview of a system 100 for collecting and processing data, including presence data and/or message data. The term "presence data" has broad connotation as used herein. The term "presentation data" includes data which generally describes a user's involvement in a data processing environment. Without limitation, such data can describe: the status of the user's interaction with the data processing environment; the nature of the tasks that the user is undertaking within the data processing environment; salient characteristics regarding the user at the time of the user's interaction with the data processing environment; various events that occur in the course of the user's interaction with the data processing environment, and so on. Presence data can also originate from groups of users, organizations of any type, automated mechanisms (e.g., location providing mechanisms, etc.), and so on. The term "presence information" refers to any part of a body of collected presence data.

The term "message data" refers to content extracted from the messages being exchanged among communication participants. Generic reference to "data" refers to either presence data, message data, or both presence data or message data, or any other type of data or combination of data types.

The data is collected from a presence-based environment 102. The presence-based environment 102 corresponds to any environment in which users which have an active network presence can communicate with each other in a real-time manner. One example of a presence-based environment is an instant messaging (IM) system. An IM system refers to a system in which users who are currently logged into the instant messaging system (or otherwise actively engaged in the IM system) can communicate with each other. Namely, these users can communicate with each other by sending textual messages and other information to each other.

In an IM system, presence data can include status-related presence data. The status-related presence data informs a user's contacts that the user is currently online, away, busy, and so forth. Presence data can also convey personal data to the user's contacts. The personal data may reveal a personal textual message associated with the user, a display name, and so forth. The presence data can also convey information regarding what the user is doing at a current point in time, such as playing a particular song, playing a particular game, and so on. Presence data in the context of an IM system can encompass yet other kinds of information. Generally, the presence data serves the operational role of facilitating communication among users of the system, e.g., by giving users insight as to what is happening among communication participants. In an IM system, the message data can include content extracted from the messages being exchanged, which typically includes textual content, but can also include other types of content.

The presence-based environment 100 can rely on presence-based communication functionality 104 to exchange messages among participants. Although not shown, the presence-based communication functionality 104 can include various connection servers (for administering connection among participants), various presence servers (for managing presence data), and so on. The presence-based communication functionality 104 can also include one or more stores 106 for retaining various data used by the presence-based communication functionality 104, such as presence data, permission data (e.g., access control lists and the like), subscription data, message content, and so on.

In one case, a collection of user devices (108, 110, 112, . . . 114) can communicate with each other (and with other entities) using the services provided by the presence-based environment 102. For instance, FIG. 1 shows that a representative user device 108 and user device 110 are using the services of the presence-based communication functionality 104 to conduct an IM conversation. Each user device can correspond to any kind of electronic processing device, such as a personal computer, a laptop computer, a personal digital assistant (PDA), a game console device, a set-top box associated with a television unit, and so forth.

The user devices (108, 110, 112, . . . 114) can interact with the presence-based communication functionality 104 via one or more networks 116. The networks 116 can represent a local area network (LAN), a wide area network (WAN) (e.g., the Internet), or some combination of LAN(s) and WAN(s). The networks 116 can be implemented by any combination of wireless links, hardwired links, routers, gateways, name servers, and so forth, and can be governed by any protocol or combination of protocols. In addition, or alternatively, the user devices (108, 110, 112, . . . 114) can interact with each other, at least in part, using peer-to-peer (P2P) communication. For example, two or more of the user devices (108, 110, 112, . . . 114) can rely on the presence-based communication functionality 104 to set up a connection with each other, and thereafter use P2P communication to handle certain aspects of inter-device communication (e.g., to transfer of files, etc.).

The system 100 also includes a data-utilizing environment 118. The purpose of the data-utilizing environment 118 is to collect data from the presence-based environment 102 (including presence data and/or message data). Based on its processing, the data-utilizing environment 118 can generate result information, e.g., in corresponding to various types of reports, targeted advertisements, and so forth. In this sense, the data-utilizing environment 118 integrates a data mining operation into a traditional presence-based communication operation, collecting and using IM data for purposes other than what that this data was originally intended to serve.

In one case, the presence-based environment 102 and the data-utilizing environment 118 comprise two sets of functionality, each including various servers, routers, data stores, and/or other data processing equipment. More specifically, in one implementation, the presence-based environment 102 and the data-utilizing environment 118 can comprise entirely separate sets of functionality, administered by the same entity or by two respective entities. In another case, the presence-based environment 102 and the data-utilizing environment 118 can share functionality. For instance, one or more servers devoted to performing traditional IM communication tasks (associated with the presence-based environment 102) can also perform data-mining tasks (associated with the data-utilizing environment 118).

The data-utilizing environment 118 includes a data extraction module 120 configured to collect data from the presence-based environment and to optionally perform preliminary processing on the data. The data extraction module 120 produces extracted information. The data-utilizing environment 118 can also include a data application module 122. The data application module 122 is configured formulate the extracted information to produce result information. The result information can correspond to a report, an advertisement, and so forth. FIG. 1 shows that the data-utilizing environment 118 can form an integral system (by virtue of the dashed lines that encompass the components of the data-utilizing environment 118). However, in another case, different parts of the data-utilizing environment 118 can be implemented by two or more distinct systems, potentially administered by two or more entities. For example, two entities can implement the data extraction module 120 and the data application module 122, respectively. The operations performed by the data extraction module 120 and the data application module 122 will be explained in greater detail below.

Beginning with the data extraction module 120, this component includes a data collection module 124. The role of the data collection module 124 is to collect data from the presence-based communication functionality 104. The data collection module 124 can perform this task in various ways. In one mode, the data collection module 124 can proactively pull data from the presence-based communication functionality 104. In another mode, the presence-based communication functionality 104 can push data to the data collection module 124. In another mode, the collection module 124 can receive data using a combination of pull and push techniques.

As explained above, the data can include presence data, which, in turn, can comprise any type or combination of types of data mentioned above, including status information, personal message information, "what I am doing" type information, and so on. In one technique, the presence data can include textual content and/or other types of content. The presence data may be expressed in a predetermined format or in an arbitrary format. In one case, the presence data is expressed in the eXtensible Markup Language (XML) format. The data can also include message data. The message data corresponds to content that is part of the messages being exchanged among communication participants. The message data can include textual content and/or other types of content. Generally, the data collected by the data collecting module 124 is referred to as collected data herein.

In one approach, the data-collection module 124 can receive data from one or more presence servers (not shown) used by the presence-based communication functionality 104. In one implementation, these presence servers maintain presence data regarding corresponding user activity so long as the users are logged into the presence-based communication functionality 104 (or otherwise actively engaged with the presence-based communication functionality 104). In another case, the presence servers can be configured to retain certain types of presence information after the users log off of the presence-based communication functionality 104.

In another approach, the data-collection module 124 can receive data from one or more connection servers (not shown) used by the presence-based communication functionality 104. In one configuration, the data flows through these connection servers without being retaining by these servers. The data collection module 124 culls the data as it is passed through the connection servers.

The data extraction module 124 also includes a data processing module 126. The purpose of the data processing module 126 is to extract information from the collected data, to thereby produce extracted information. The data processing module 126 can use different techniques to perform this operation. For instance, the data processing module 126 can apply different techniques to extract information from different types of collected data.

As a first pass, the data extraction module 124 can extract information from predetermined fields of the collected data. For example, consider the illustrative case in which the presence data is expressed in the following XML format:

```
<Data>
    <PSM>{PSM-Text}</PSM>
    <CurrentMedia>{Media-Content}</CurrentMedia>
    <MachineGuid>{Machine-GUID}</MachineGuid>
</Data>
```

The PSM field identifies a personalized message defined by a user. The Current Media Field identifies the media that the user is currently listening to (e.g., as obtained from metadata provided by a media player module). The Current Media field, in turn, can include subparts which identify the title of the song that the user is listening to, the name of the album associated with this song, the artist of the song, and so forth. The Machine Guide field can identify a unique number associated with the user device that has provided the presence data.

In the first pass, the data-processing module 126 can extract data of interest from predetermined fields of the collected data. For example, in the case that the intent is to mine the personal message field for information presented therein, the data processing module 126 can extract the text portion that is delimited by appropriate tags in the collected XML data.

As a second pass, the data-processing module 126 can compare the collected data with predetermined rules to interpret the collected data. For example, consider the illustrative case in which the collected data comprises textual information. For instance, the collected data may include presence data that provides a personal text message, or the collected data may include message data that includes text content. The data processing module 126 can compare the collected data with one or more predetermined content-related items in a store 128. For example, the predetermined content-related items may correspond to predetermined key words. Upon a match, the data processing module 126 can extract parts of the collected data that are relevant to the matching content. In addition, or alternatively, the data processing module 126 can register the occurrence of the relevant parts of the data, e.g., by maintaining a count or other statistics regarding the relevant parts, by tagging the location of the relevant parts, and so on. In one case, the data processing module 126 can apply the above-described approach to extract presence data and/or message data that includes predetermined names of celebrities or other topics of interest.

In another case, the predetermined content-related items can correspond to predetermined templates. The data processing module 126 can compare the collected data to these predetermined templates. Namely, the data processing module 126 can use the templates to identify certain parts of the collected data that match the templates. The data processing module 126 can then optionally extract and/or otherwise register the matching parts for further processing and analysis.

In addition, or alternatively, the data processing module 126 can scrub the collected data to remove data that may be considered confidential or personal to communication participants. Such data may include unique device numbers, passwords, account numbers, user names, and so on.

While the data processing module 126 may remove certain sensitive data, it can also add information to the collected data. For example, the data processing module 126 can assign reference IDs to data that originates from different users. The reference IDs help the data processing module 126 identify whether it has extracted two or more pieces of data that are exact duplicates for a particular user. In this case, the data processing module 126 can be configured to retain only one copy of the collected data.

In addition, or alternatively, the data processing module 126 can retain information regarding the general characteristics of the users. For example, assume that a particular piece of data originates from presence data and/or message data associated with a particular IM user. The data processing module 126 can strip away the identity of the specific user, but retain demographic information which identifies the age of the user, the gender of the user, the geographic location of the user, and so on. The data processing module 126 can extract the demographic information (or the like) from various sources. In one case, the presence-based environment 102 may retain this information, as gleaned from a set-up procedure when the users originally register for the IM service. In another case, the presence-based environment 102 can extract demographic information from other sources. For instance, the data processing module 126 can determine the location of a user device based on one or more network addresses associated with the user device.

In one business paradigm, the system 100 may inform the users that data associated with their IM conversations may be extracted for data-mining purposes, while maintaining the anonymity of the user. The system 100 may invite the user to opt into or out of such a provision. In one case, the system 100 may allow the user to accept or decline all data mining uses of his or her data. In another case, the system 100 may allow the user to accept or decline specific ways that the data-utilizing environment 118 may utilize the extracted data. In another case, the system 100 can provide the user some type of incentive for conferring on the data utilizing environment the right to process collected data.

In still other cases, instead of sanitizing the collected data by removing specific references to users, the data processing module 126 can retain such references. These references may allow the data application module 122 to establish targeted interaction with certain users in the manner to be described below. Again, as stated above, the system 100 may invite the user to opt out of such a provision.

The data extraction module 120 can store identified information in an extracted information store 130. The identified information can comprise original data that is collected by the data collecting module 124 and/or extracted information that is extracted by data processing module 126. In one case, the data extraction module 120 can store the information in a SQL database. This allows data to be retrieved from the extracted information store 130 using SQL queries.

Now turning to the data application module 122, this module 122 receives information from the extracted information store 130 and processes this information to produce result information. The data application module 122 can include different application modules for producing different types of result information. The data application module 122 can deliver the result information to users devices (108, 110, 112, . . . 114) and/or other destinations using a push model (at the prompting of the data application module 122) or a pull model (at the prompting of the user devices), or by a combination of push and pull techniques.

The data application module 122 can provide the result information in various forms. In one case, the data application module 122 provides the result information as one or more documents of any type. The data application module 122 can supply these documents using any transfer technology, such as Email transfer, SMS notification message transfer, IM message transfer, FTP transfer, etc. In another case, the data application module 122 provides the result information as one or more reference items, such as hypertext links, which allow recipients to retrieve the result information upon activating the reference items. The data application module 122 can, in addition or alternatively, embed the result information into a page of other content that is delivered to the user. In another case, the data application module 122 can include a feed generating module 132 that generates the result information in the form of a feed. Generally, the data application module 122 can adopt any one or combination of the above-described delivery strategies, or yet some other delivery strategy.

In one case, the data application module 122 can provide the result information by making targeted searches of the extraction information store 130 based on or more criteria. In one case, the data application module 122 can perform this operation as a backend task, produce the result information, and then deliver the result information upon the occurrence of appropriate triggering events (e.g., when the user or other entity asks for this information). In another case, the data application module 122 can dynamically pull information from the extracted information store 130 and prepare the result information upon the occurrence of a triggering event (e.g., in response to an advertising opportunity, a user or other entity query, and so on). The entity making the request and/or receiving the response can correspond to a human user and/or an automated mechanism or service.

Without limitation, the data application module 122 can provide the following representative types of result information.

Reports Based on Aggregated Findings

In one case, the data application module model 122 can produce result information in the form of aggregated findings. Namely, the data application module 122 can count instances of certain informational items in the extracted information store 130 to provide aggregated findings. The data application module 122 can form such a count within a specified time frame, that is, within a time frame having any specified starting time and ending time. For example, assume that the objective is to determine how many users are currently talking about a certain topic. The data processing module 126 can extract instances of certain keywords associated with this topic from presence data (e.g., from personal messages adopted by users) and/or message data (e.g., from the bodies of the messages). The data processing module 126 approximate the criterion "currently talking about" by extracting the keywords from data collected in the last n interval of time, such as the last 30 seconds, last minute, last hour, last day, and so forth. The data processing module 126 can store the extracted information in the extracted information store 130. Then, the data application module 122 can count the number of times that certain keywords appear in the collected data. Based on this type of analysis, the data application module 122 can produce a report which identifies the n most popular topics in any given time interval, e.g., based on the n keywords that are used most frequently within that interval.

In the above example, the data application module 122 forms aggregated findings by counting key words. In addition, or alternatively, the data application module 122 can count additional items or events. For instance, users may use links in their personal messages. The data application module 122 can form aggregated findings by counting the number of times various links appear in personal messages.

The data application module 122 can organize aggregated findings in various ways. In one case, the data application module 122 can organize aggregated findings in various categories. For example, the data application module 122 can organize various counts based on subject matter-related categories, such as representative categories of sports, headline news, music, celebrity gossip, and so on. In addition, or alternatively, the data application module 122 can organize various counts based on demographic information (where "demographic information" broadly refers to any characteristic or characteristics associated with users). For example, the data application module 122 can prepare a report that identifies prevalent topics in the IM environment for certain age groups, for certain genders, for certain geographic locations, for certain education levels, and so on. The data application module 122 can glean this type of demographic information in various ways. For instance, recall that the data processing module 126 can extract demographic information and store this information in an extracted information store 130.

In another scenario, the data application module 122 can prepare aggregated findings for a custom-specified group of users. For example, a user (or other entity) can request a report to be generated that is based on presence information, message data, etc. associated with the user's contacts or other defined social group. For example, a user can request a report that identifies popular topics among the user's friends. The user can define his or her contacts with any degree of granularity. A user can prepare a report for certain contacts (e.g., friends) but not other contacts (e.g., co-workers). Further, a user can specify contacts as encompassing "friend-of-a-friend" type of relationships out to a specified degree of relation n.

The data application module 122 can prepare aggregated findings based on all of the traffic flowing through the presence-based environment 102. In another case, the data application module 122 can prepare aggregated findings based on a sampling of the total amount of traffic. In the latter case, the data application module 122 can extrapolate what is happening in the entire environment. The data application module 122 can express its results using an identified degree of confidence, e.g., which is based on the sample size and/or other factors.

As mentioned above, the data application module 122 can prepare aggregated findings concerning current activity in the presence-based environment 102. In another case, the data application module 122 can provide aggregated findings over longer time spans, such as the last day, the last month, the last year, etc., as well as custom-specified time periods (e.g., from October through December of 2003, etc.).

Advertisements and the Like

In other case, the data application module 122 can prepare result information in the form of an advertisement. The advertisement is based on the information stored in the extracted data store 130. Namely, for instance, the data application module 122 can generate the advertisement so that it has some nexus to aggregated findings. For example, assume that the data application module 122 determines that a significant number of users are discussing a musical artist, such as Tony Benet. The data application module 122 can prepare an advertisement for dissemination to all users. This advertisement might invite the users to purchase the latest CD produced by Tony Benet. The advertisement can optional provide information which identifies the reason it has been sent, e.g., by notifying the user, "The IM world is buzzing about Tony Benet's new CD," or even more specifically, "5% of users are now talking about Tony's Benefit's new CD—want to find out more?"

In another case, the data application module 122 can prepare and send different advertisements to different groups of users. For example, the data application module 122 may determine that users that are over 40 years old are discussing the artist Tony Benet, while users under 20 years old are discussing a younger artist. The data application module 122 can leverage this knowledge by providing a certain type of advertisement to older users and another type of advertisement to younger users. For instance, the data application module 122 can send advertisements related to Tony Benet, Frank Sinatra, etc. to only users over the age of 40.

In another implementation, the data application module 122 can retain information that relates a body of collected data (presence data and/or message data) with a specific user associated with this data. Based on this knowledge, the data application module 122 can send a targeted advertisement. The targeted advertisement can include information that is specifically based on the content of this user's presence data and/or message data. For example, the data application module 122 can determine that a particular user seems to be frequently conversing about the artist Tony Benet in various IM sessions. Based on this insight, the data application module can direct a targeted advertisement to this user.

The data application module 122 can generate yet other types of advertisements. Any of the advertisements mentioned above can be produced to include hypertext links. The hypertext links direct the user to a respective sites associated with the topics being advertised. For example, where the objective of an advertisement is to entice the user to purchase a particular product, the link can direct the user to a network-accessible site associated with the merchant of this product.

Answers to Queries

In another scenario, the data application module 122 can produce result information in the form of an answer to the user's query. For example, instead of pushing information to the user in the form of a report, the data application module 122 can permit a user to make an on-demand query. This query can be expressed as one or more key words and/or other type of criteria. The data application module 122 responds by matching the query with information stored in the extracted information store 130, which may include raw collected data and/or information extracted therefrom. The data application module 122 can then return the answer to the user. For example, assume that the user enters the query, "Bono." The data application module can return information which identifies how many users are currently talking about the topic of "Bono," e.g., which may coincide with a tour of the rock band U2. Again, the criterion "currently" can be qualified in various ways; for instance, "currently" may refer to the last 10 minutes, etc.

Like the case of reports, the user can make queries that target certain groups of people. For example, the user can enter the keyword "Bono" in combination with the demographic selections of "adolescent" and "male" to determine how popular this artist is for adolescent males. The user can make similar targeted queries with respect to his or her own contacts (e.g., friends, co-workers, friends-of-friends, etc.).

The three types of result information described above (reports, advertisements, and query responses) are representative. The data application module 122 can use the information in the extracted information store 130 to produce yet other types of result information.

As mentioned above, the data application module 122 can supply the result information to the user in various forms in various contexts, based on various criteria. Generally, in one context, the data application module 122 can offer the result information to participants of the presence-based environment 102, such as users of an IM system. In this case, the data application module 122 can display report information, advertisement information, and/or query responses to the user in the context of an IM-related user interface presentation. In addition, or alternatively, the data application module 122 can display links to such result information in an IM-related context. The users can click on the links to retrieve the report information, advertisement information, and/or query responses. In one specific implementation, the data application module 122 can provide one or more automated agents (e.g., robots or BOTs). An IM user can one or more of these agent as contacts in a user's contact list. The user can activate one of these agents to interact with the data application module 122 and to obtain result information therefrom. Alternatively, the data application module 122 can directly populate the user's IM experience with the content such result information.

The data application module 122 can also provide the result information to users outside the context of an IM system. For example, the data application module 122 can provide report information as a network-accessible resource (e.g., on a website), and the user can independently access this resource using a web browser to view the result information. In another case, as mentioned above, the data application module 122 can push the result information down to the users in a non-IM context, such by using Email messages, RSS feeds, and the like.

In yet another case, the data application module 122 can offer the result information to recipients for a fee. For example, an advertiser may be interested to know the topics that IM users are conversing about. The advertiser may thus pay a fee to receive a report which identifies, for example, the number of times certain key words appear in IM presence data and/or message data. Consider the illustrative case of a concert promoter. This entity may be interested to learn how many users are talking about the music group U2 in different regions of the United States. This would help the promoter decide the regions where it might be most appropriate to schedule concerts. In general, an entity can opt to receive an open-ended report which identifies the topics (e.g., associated with key words in the like) that users are conversing about. In another case, an entity may ask to receive a report which narrowly focuses on a certain topic, as identified by one or more predetermined keywords of interest, or perhaps a general subject matter domain, etc.

As another general consideration, the data application module 122 can operate with varying degrees of anonymity, and the user may be optionally given the opportunity (e.g., in a set-up procedure) to select the desired degree of anonymity. In a first mode, the data application module 122 generates sanitized results. These results are not specifically targeted to a recipient, and furthermore, there is no way that the recipient can associate the findings in the report with the specific identities of any other user.

In a second mode, it may be apparent to the recipient that the result information has been prepared, in part, based on the nature of the presence data and/or message data generated by this recipient. But, in this second mode, the user is still unable to uncover the identities of any other user.

In a third mode, the result information gives a recipient at least some information which relates to specific other users. For example, the result information may identify the user names of these other users and/or provide link information which allows the recipient to contact one or more other users. In this case, there is an assumption that these other users have expressly authorized the dissemination of their contact information for any number of reasons. Consider the illustrative case in which a user adopts a personal message as part of her IM identity that reads, "Got Tickets to Red Sox-Yankee Game. Full Price." This user may expressly authorize the data application module 122 to publish this personal data to other users or perhaps a subset of users (such as the user's contacts, or users in the Boston area). The result information published to these other users can convey the personal message (or some derivative/synopsis thereof) and provide contact information which enables the recipients to contact the message's author. In another case, instead of a neutral advertisement for the band U2, the advertisement can include a link which identifies all the users who happen to be selling tickets to this concert, selling souvenirs, attempting to secure rides to the concert, and so forth. Again, insofar as this is personal data, the owners of this data may be given the option of publishing this data or not publishing this data.

A.2. User Device Perspective

Figure 2:
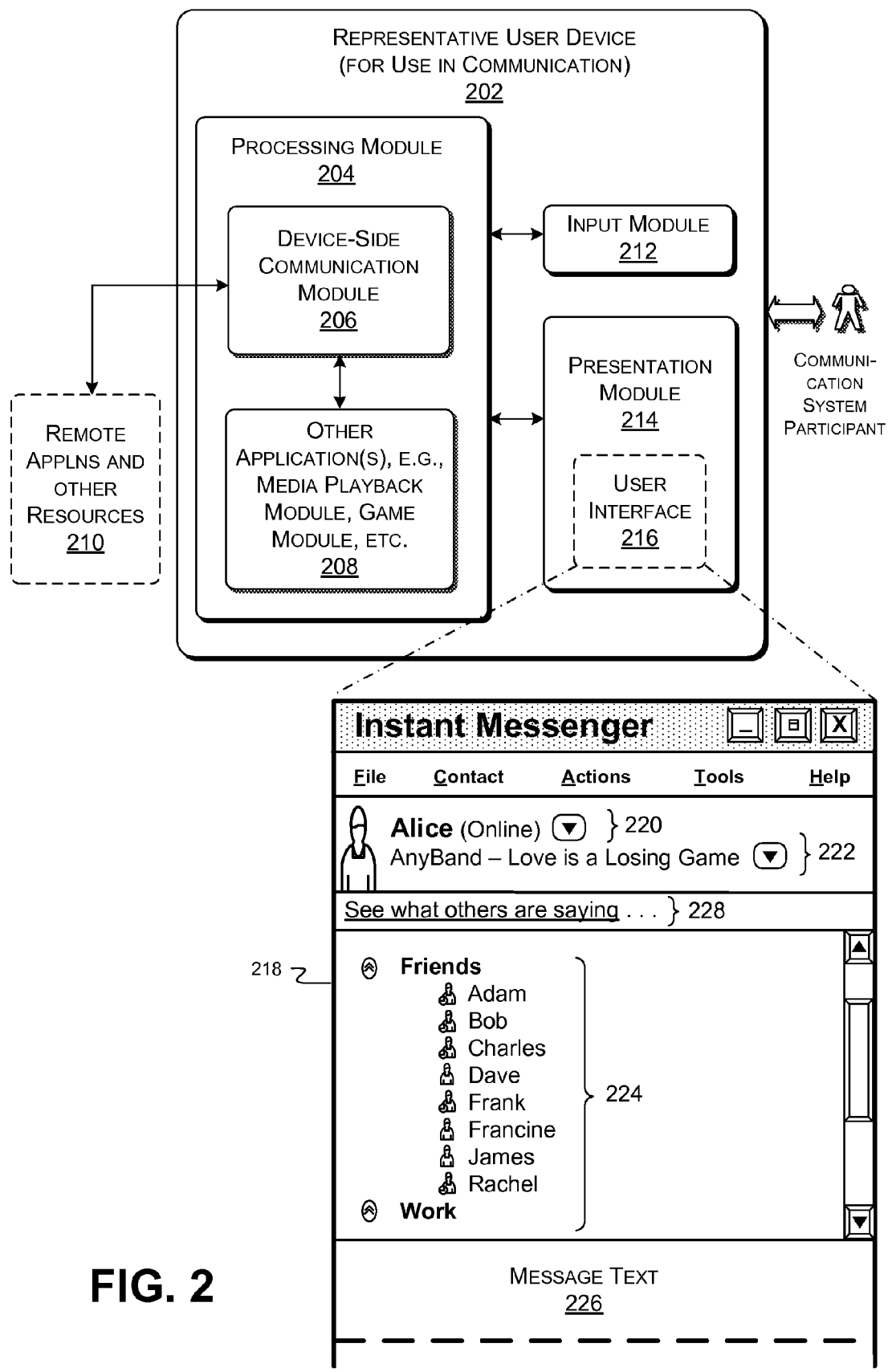
FIG. 2 shows an illustrative user device for interacting with the system of FIG. 1 to conduct an instant messaging communication system.

FIG. 2 shows a representative user device 202 for interacting with the presence-based communication functionality 104 of FIG. 1. In this case, the presence-based communication functionality 104 corresponds to an IM system, so the user device 202 includes functionality for interacting with the IM system.

More specifically, the user device 202 includes a processing module 204 for handling various processing tasks. For instance, the processing module 204 includes a device-side communication module 206 for interacting with the server-side presence-based communication functionality 104 (of FIG. 1) and/or for directly interacting with other user devices in P2P fashion. The processing module 206 can also include one or more other local application modules 208, such as a music player application module, a game player application module, a video presentation module (e.g., for presenting television broadcasts and the like), and so forth. In one implementation, the device-side communication module 206 can extract information regarding the user's activities with respect to the other local applications module 208, and add this information as presence data to be reported to the presence-based communication functionality 104. This type of presence data, in turn, may be collected by the data extraction module 120. For instance, consider the case in which the user is listening to background music on a music player while exchanging IM messages with a friend. The device-side communication module 206 can extract the name of the song from metadata supplied by the music player, and then add this song name to its presence data which it reports to the presence-based communication functionality 104. Consider another case in which a user is watching television using a video presentation module. The device-side communication module 206 can extract the name of the television program that the user is watching and communicate this information to the presence-based communication functionality 104.

The device-side communication module 206 can also interact with other remote application modules (e.g., network-accessible resources). In a similar way, the device-side communication module 206 can extract presence data that pertains to the use's interaction with these remote application modules, and this presence information can be potentially extracted by the data extraction module 120.

The user device 202 can include one or more inputs modules 212, such as a keyboard, a mouse, voice recognition functionality, and so on. An IM participant can interact with the user device 202 via these input modules 212. The user device 202 can also include one or more presentation modules 214. The presentation modules may present information to the user in visual and/or audible form, allowing the IM participant to interact with the user device 202. In one case, the presentation module 214 in conjunction with the device-side communication module 206 can generate a graphical user interface presentation 216.

One particular user interface presentation produced by the user device is an IM interface panel 218. The IM interface panel 218 can include information 220 which identifies the user (Alice), together with an optional personal message 222 adopted by the user. The IM interface panel 218 can also identify the user's contacts 224. The IM interface panel 218 includes a message section 226 that allows a user to compose a message to any one of her contacts 224, and to receive messages generated by any of these contacts 224.

The IM interface panel 218 includes or makes references to various fields of information that can be extracted by the data extraction module 124 when this information passes through the presence-based communication functionality 104. The data can include presence data, such as an indication that Alice is currently online. The presence data also includes Alice's personal message 222. The data that can be extracted also includes message data, corresponding to the message text that Alice is composing to be sent to another user, or the message text that Alice receives herself from another user or other users. Still other types of data can be extracted in the course of Alice's interaction with the IM interface panel 218.

The user's interaction with the environment 100 using an IM system is representative. The user can interact with the user using other types of systems and associated user interfaces, and the data extraction module 120 can extract various data associated with this interaction.

Figure 3:
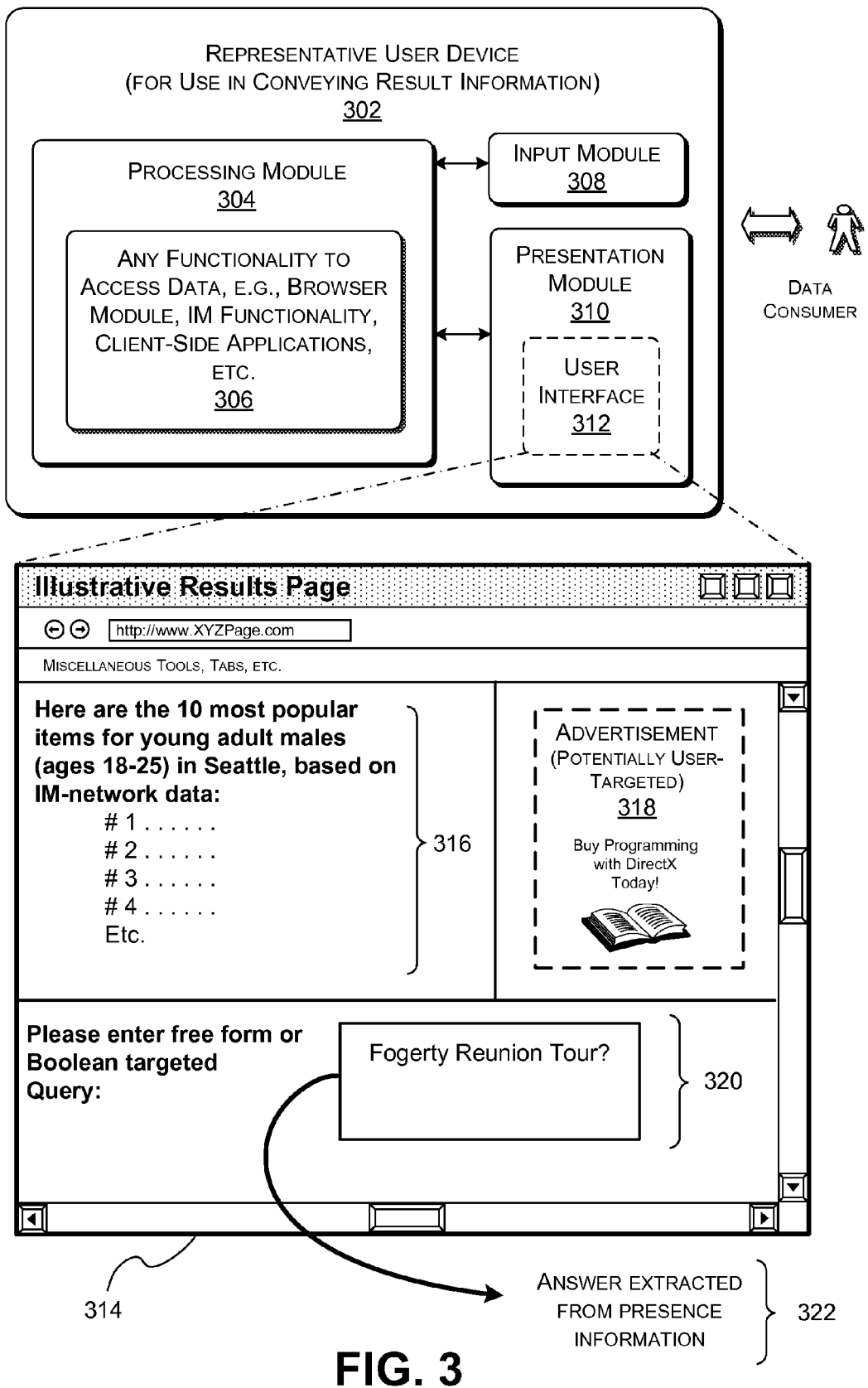
FIG. 3 shows an illustrative user device for interacting with the system of FIG. 1 to receive result information generated by the system.

FIG. 3 shows another user device 302. This figure serves as a vehicle for discussing ways that a user can receive the results of the data application module 122. The user device 302 shown in FIG. 3 can be the same as or different than the user device 202 shown in FIG. 2.

The user device 302 includes a data processing module 304 for performing various tasks. The data processing module 304, in turn, can include any functionality 306 for presenting the results of the data application module 122. Without limitation, the functionality 306 can include browser functionality (for accessing one or more network-accessible resources that provide the result information), IM functionality, Email functionality, feed reception functionality, and/or various other client-side application modules, and so forth. In one mode of operation, the functionality 306 automatically receives the result information as it is independently pushed down to the user device 302 by the data application module 122. To cite a few examples, the user can automatically receive result information that is sent to her via Email, RSS feed, as an advertisement within any host page, and so on. In another case, or in addition, the functionality can be operated in an on-demand fashion by requesting the result information generated by the data application module 122. To cite a few examples, the user can independently use a browser to access a website that provides the result information, or the user can enter a targeted query to retrieve specific information from the data application module 122.

The user device 302 includes one or more user input modules 310 and one or more presentation modules 310 that allow a user to interact with the user device 302. The presentation module 310 can display graphical user interface presentation 312.

The user device 302 can represent various types of result information in different contexts. For economy of explanation, FIG. 3 shows a user interface page 314 that represents a conglomerate of different types of displays sections that can be produced to convey the result information. It will be understood, however, that any of the display sections can be presented individually (without the other section), and any display section can be presented in the context of any host page content (or by itself). It will also be appreciated that the look and feel of the display sections is merely representative; other implementations can adopt other types and styles of presentations.

The representative user interface page 314 includes a first section 316 which presents result information in the form of a report. The report presents aggregated findings for a specific demographic category. Namely, report identifies the 10 most popular items for young adult males (ages 18-25) in the Seattle area. The data application module 122 can compile this list by identifying the 10 most popular key words that are being exchanged among users, e.g., as found in presence data and/or message data, etc. In one case, the data application module 122 can compile this list by comparing the collected data with a list of predetermined key words. In another case, the data application module 122 can prepare this list without preconceptions regarding what key words to look for (except perhaps to omit certain key words of limited informational value).

The representative user interface page 314 includes a second section 318 that presents result information in the form of an advertisement. As discussed above, the topic of the advertisement reflects the nature of the data collected from the presence-based environment 102. In one case, the advertisement may reflect a topic that many people seem to be conversing about, but the recipient does not have any particular nexus to this topic. In another case, the advertisement may reflect a topic that many people seem to be conversing about, and the recipient does in fact have a connection to this topic. In one case, for instance, the data application module 122 has information to indicate that the topic is popular among users over 40 years old, and the recipient happens to be a user that is also over 40 years old. In another case, the data application module 122 can make a targeted determination that this specific recipient has been conversing about a particular topic (such as DirectX graphics technology), so the data application module 122 presents an advertisement to recipient which may be pertinent to this topic (e.g., a book related to this topic). Further, as discussed above, the advertisement can optionally allow the recipient to identify one or more other users. For example, assume that the recipient has been talking about DirectX programming technology. In response, the data application module 122 can present an advertisement to the recipient which identifies one or more other users who have some merchandise related to this topic, or who perhaps may wish to converse on this topic, and so on.

The representative user interface page 314 includes a third section 320 that presents result information in the form of a query input and response interface. For example, a user can enter a directed query through this section, e.g., in this case, "Fogerty Reunion Tour." The data application module 122 can respond to this query by presenting an answer 322. The answer 322 can identify statistics regarding the number of people who are talking about the same concept. In addition, or alternatively, the data application module 122 can present links to other users who happen to be discussing the same topic.

As noted above, the data application module 322 can present its result information in any context, including in a context of an IM application and/or in a context that is independent of an IM application. For example, the user interface page 314 shown in FIG. 3 presents the results information in a context that may be independent of a user interface application. In contrast, returning to FIG. 2, this user interface page 218 can present result information in the context of an IM user interface application. Namely, the user interface page 218 that is devoted to IM communication can include one or more links, such as representative link 228, which invite the user to access result information. In addition, or alternatively, the user interface page 218 can present the result information as a part (or parts) within the page itself.

A.3. Illustrative Processing Functionality

Figure 4:
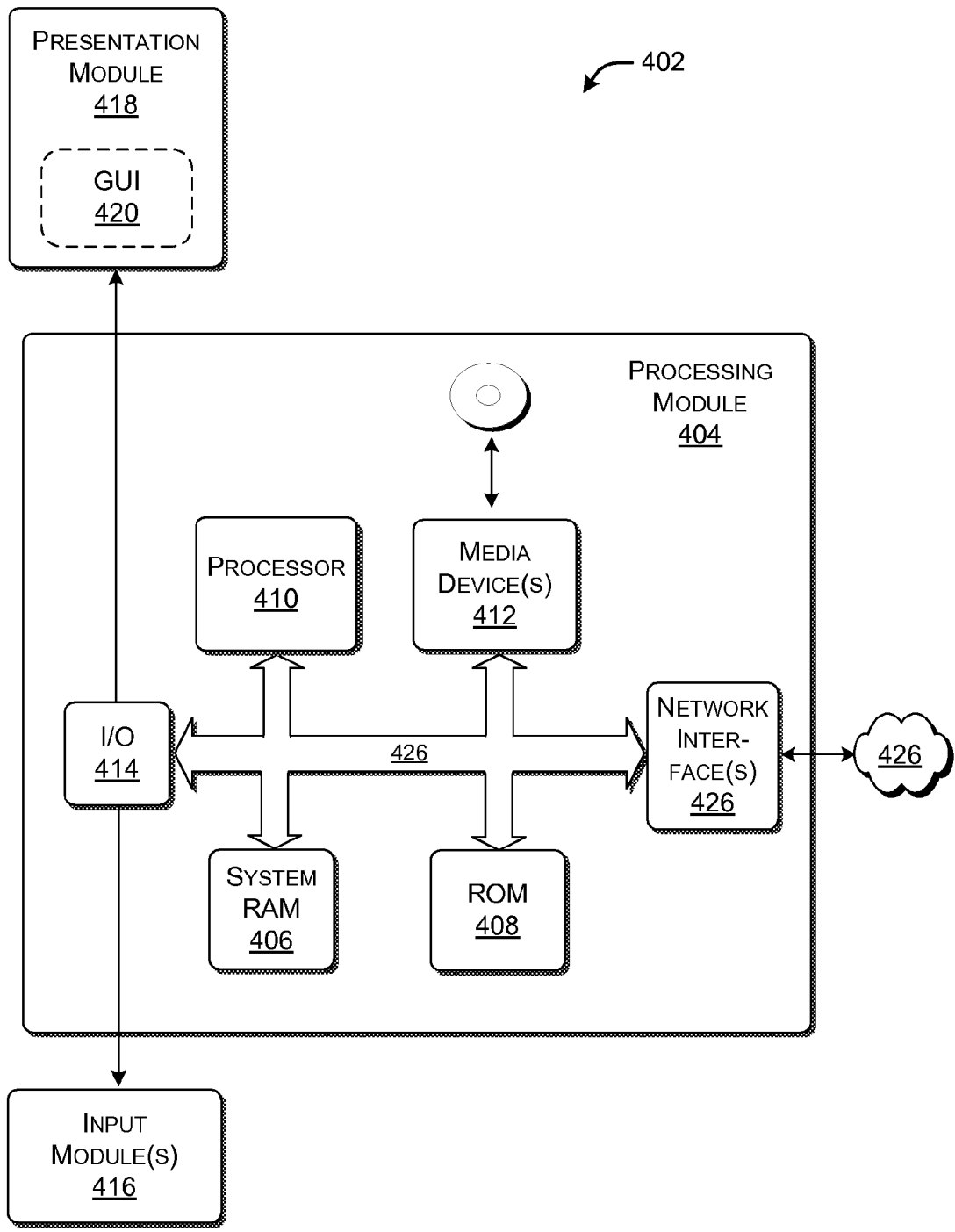
FIG. 4 shows illustrative processing functionality that can be used to implement any aspect of the system of FIG. 1.

FIG. 4 sets forth illustrative processing functionality 402 that can be used to implement any aspect of system 100 shown in FIG. 1. In one non-limiting case, for instance, the processing functionality 402 may represent any computer machine used by the system 100, e.g., to implement any aspect of a server-side computer (associated with the presence-based infrastructure 102, and/or the data-utilizing environment 118, etc.), to implement any aspect of any user device, and so on.

The processing functionality 402 can include a processing module 404 for implementing various processing functions. In the case of the representative user devices (202, 302) of FIGS. 2 and 3, respectively, the processing module 404 can correspond to the processing modules (204, 304), respectively. The processing module 404 can include volatile and non-volatile memory, such as RAM 406 and ROM 408, as well as one or more processors 410. The processing functionality 402 can perform various operations identified above when the processor(s) 410 executes instructions that are maintained by memory (e.g., 406, 408, or elsewhere). The processing functionality 402 also optionally includes various media devices 412, such as a hard disk module, an optical disk module, and so forth.

The processing functionality 402 also includes an input/output module 414 for receiving various inputs from the user (via input modules 416), and for providing various outputs to the user (via output modules). One particular output mechanism may include a presentation module 418 and an associated graphical user interface (GUI) 420. In the case of the representative user devices (202, 302) of FIGS. 2 and 3, respectively, the input module 416 can correspond to the input modules (212, 308), respectively, and the presentation module 418 can correspond to the presentation modules (214, 310), respectively. The processing functionality 402 can also include one or more network interfaces 422 for exchanging data with other devices via one or more communication conduits 424. One or more communication buses 426 communicatively couple the above-described components together.

B. Illustrative Procedures

FIGS. 5 and 6 show procedures which explain the operation of the system 200 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As the functions described in the flowcharts have already been set forth in Section A, Section B serves principally as a review of those functions.

B.1. Data Collecting Operation

FIG. 5 is a flowchart that shows a procedure 500 for collecting data from a presence-based environment, such as an instant messaging system.

In block 502, the data extraction module 120 collects the data. The collected data can correspond to presence data and/or message data.

In block 504, the data extraction module 120 optionally pre-processes the collected data to provided extracted data. The processing can entail extracting predetermined parts of the collected data (e.g., by making reference to predetermined key words and/or templates), removing sensitive data, and so on.

In block 506, the data extraction module 120 can store the information that it produces in the extracted information store 130. The information that is stored can comprise original raw collected data and/or extracted information.

FIG. 6 is a flowchart that shows a procedure 600 for applying the information produced by the data extraction module 120. The data application module 122 of FIG. 1 can perform this role.

In block 602, the data application module 122 can detect a triggering event which prompts the data application module 122 to generate result information. Such a triggering event can correspond to a determination (based on any consideration(s)) that it is time to proactively send result information to one or more users. Such a triggering event can also correspond to a targeted query by a user to access certain collected data.

In block 604, the data application module 122 can pull appropriate data from the extraction information store 130 to use in formulating the result information. For example, if the objective is to generate a report concerning the popularity of the artist Bono in IM conversations, then the data application module 122 can extract instances of information maintained in the extraction information store 122 in which this artist was mentioned.

In block 606, the data application module 122 can produce result information in a desired form. The desired form can comprise a report (optionally organized by one or more demographic categories), an advertisement (optionally targeted for a specific recipient), and/or an answer to a query posed by the user.

In block 608, the data application module 122 can forward the result information to the recipient. In one case, the data application module 122 proactively sends the result information to the user. In another case, the user may independently retrieve this information, e.g., by clicking on a link to access this information on a network-accessible site.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for collecting and processing data, comprising:

collecting data from a presence-based system that enables a plurality of users to exchange one or more instant text messages in an instant message session via session interfaces on corresponding computing devices, the collected data at least including textual data of each instant message and a personal message adopted by a sending user for display as part of an identity of the sending user in a corresponding session interface;

receiving a designation of one or more specific users from a group of users that are able to view the personal message as part of the identity of the sending user in one or more corresponding instant message sessions, the identity of the sending user without the personal message being otherwise viewable to the group of users in respective instant message sessions;

providing the personal message for display, on a session interface of a computing device that belongs to a recipient user during the instant message session when the recipient user is included in the one or more specific users designated as being able to view the personal message as part of the identity, of the sending user;

extracting information from the collected data based on at least one predetermined rule to obtain extracted information at a server;

presenting an advertisement on the session interface of the recipient user designated as being able to view the personal message based on the extracted information, the advertisement being textually related to the personal message;

formulating result information at the computing device based on the extracted information; and sending the result information from the server to the computing devices of the plurality of users.

2. The method of claim 1, wherein the collected data further includes data that indicates a current activity of at least one of the plurality of users.

3. The method of claim 1, wherein the personal message includes information on an item that the sending user desires to sell to the recipient user.

4. The method of claim 1, wherein the collected data corresponds to information regarding a media item that at least one of the plurality of users is consuming on the computing device while engaged in the instant message session on the computing device.

5. The method of claim 1, wherein the extracting of information comprises extracting information that includes one or more predetermined key words.

6. The method of claim 5, wherein the one or more key words include one or more names of individuals.

7. The method of claim 1, wherein the result information is expressed in the form of a report, wherein the report conveys aggregated findings that are based on the extracted information associated with at least one of the plurality of users over an identified span of time.

8. The method of claim 7, wherein the report conveys the aggregated findings in the context of at least one demographic category.

9. The method of claim 7, wherein the report conveys the aggregated findings for a defined group of individuals.

10. The method of claim 9, wherein the defined group comprises a social group specified by a user.

11. The method of claim 1, wherein the personal message includes contact information of the sending user.

12. The method of claim 11, wherein the advertisement includes a link that identifies additional users that has information related to the personal message.

13. The method of claim 1, further comprising receiving a query that includes a query text and a demographic category selection at the server from a computing device of a user, wherein the collected information further includes demographic information of the plurality of users, and wherein the formulating includes obtaining result information that matches the query text and the demographic category selection at the server from the extracted information in response to the query.

14. The method of claim 1, further comprising:

processing the collected data by removing personal data that identifies each of the users from the collected data, assigning a unique reference identifier to data that originated from each of the users, and eliminating duplicate data on each of the users based on the unique reference identifiers;

organizing the collected data based on the demographic information to prepare a report; and providing the report to a report recipient.

15. A method for collecting and processing data, comprising:

collecting data from a presence-based system that enables a plurality of users to exchange one or more instant text messages in an instant message session via session interfaces on corresponding computing devices, the collected data at least including textual data of each instant message and a personal message adopted by a sending user for display as part of an identity of the sending user in a corresponding session interface;

receiving a designation of one or more specific users from a group of users that are able to view the personal message as part of the identity of the sending user in one or more corresponding instant message sessions, the identity of the sending user without the personal message being otherwise viewable to the group of users in respective instant message sessions;

providing the personal message for display on a session interface of a computing device that belongs to a recipient user during the instant message session when the recipient user is included in the one or more specific users designated as being able to view the personal message as part of the identity of the sending user;

processing the collected data by removing personal data that identifies each of the users from the collected data, assigning a unique reference identifier to data that originated from each of the users, and eliminating duplicate data on each of the users based on the unique reference identifiers;

organizing the collected data based on the demographic information to prepare a report; and providing the report to a report recipient.

16. The method of claim 15, wherein the collecting uses: a push-based technique; a pull-based technique; or both a push-based technique and a pull-based technique.

17. The method of claim 15, wherein the demographic information comprises one or more of:

age information of users of the presence-based communication system;

gender information of the users; or geographical location information associated with the users.

18. The method of claim 15, wherein the report is based on at least one criterion specified by the recipient, wherein the providing of the report to a recipient comprises providing the report upon payment of a fee.

19. The method of claim 15, further comprising receiving at least one user's authorization to collect data associated with the at least one user.

* * * * *